Feb. 17, 1970  F. R. SAVORY  3,495,489
GUILLOTINES
Filed Dec. 28, 1967  3 Sheets-Sheet 1

Inventor,
FREDERICK R. SAVORY
By Lowe & King
Attorneys

Inventor,
FREDERICK R. SAVORY
By Lowe & King
Attorneys

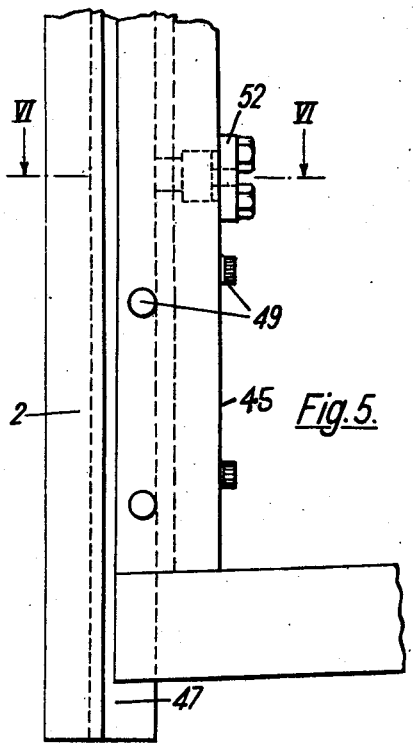
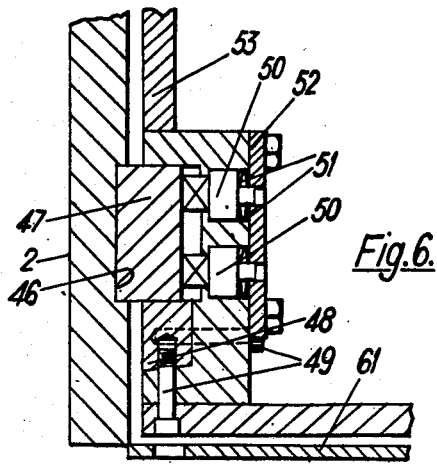

United States Patent Office 3,495,489
Patented Feb. 17, 1970

3,495,489
GUILLOTINES
Frederick R. Savoy, Sutton-in-Ashfield, England, assignor to Steel Construction & Engineering Co. (Notts) Limited
Filed Dec. 28, 1967, Ser. No. 694,286
Claims priority, application Great Britain, Jan. 14, 1967, 2,090/67
Int. Cl. B26d 7/06
U.S. Cl. 83—165                                        6 Claims

ABSTRACT OF THE DISCLOSURE

A hydraulically-operated guillotine includes side-frames and a movable blade-carrying beam extending therebetween with vertical guides for the movable blade-carrying beam but with hydraulic rams inclined downwardly and forwardly at an angle corresponding closely to the plane of the resultants of the cutting forces and the shear forces acting on the movable blade during cutting, thus substantially relieving the guides of the shear forces with consequent saving in wear on the guides, and such inclination also enables a cross-beam for transmitting the reactions of the rams to side-frames to be set back on the side-frames with vertical grooves for guide bars at the ends of the movable blade-carrying beam emerging forwardly of the cross-beam so that the guide bars may be removed for inspection and/or replacement—without first requiring removal of the movable blade-carrying beam.

---

This invention relates to guillotines, and more particularly to hydraulically-operated guillotines and is concerned with providing a hydraulically-operated guillotine of comparatively light, but strong, construction and of easy maintenance.

According to the present invention, a hydraulically-operated guillotine has vertical guides for its movable blade-carrying beam and has its rams inclined downwardly and forwardly at an angle corresponding closely to the plane of the resultants of the cutting forces and the shear forces acting on the movable blade during cutting. Thus the guides are substantially relieved of the shear forces, with consequent saving in wear on the guides.

Furthermore, in consequence of the inclining of the rams, a cross-beam for transmitting the reactions of the rams to side-frames may be set back one the side-frames and vertical grooves for guide bars at the ends of the movable blade-carrying beam may emerge forwardly of the cross-beam to enable the guide bars to be removed—for inspection and/or replacement—without first requiring removal of the movable blade-carrying beam. The guide bars are preferably secured in grooves in the insides of the side-frames, being slidable in grooves in the ends of the movable blade-carrying beam, and the grooves in the blade-carrying beam are preferably wider than the guide bars and accommodate blocks with a slight wedge section, with screws for adjusting the blocks to adjust the sliding fit of the guide bars.

Considerable clearance is preferably provided between the ends of the movable blade-carrying beam, with similar clearance between the guide bars and the bottom of the grooves so that the beam may be tilted for adjustment of the angle of cut of the blade, in accordance with changes in the thickness of material being cut, so that the cutting forces will be in substantially correct proportion to the shear forces, for all thicknesses of material within the guillotine's capacity, for the plane of the resultants of those forces to correspond closely to the inclination of the rams. Spring-loaded thrust pins preferably extend from the bottoms of the grooves in the movable blade-carrying beam into contact with the guide bars, to centralise the movable blade-carrying beam between the side-frames.

The cross-beam is preferably of fabricated box-section with the ends sealed, so that the cross-beam may serve as a reservoir for the hydraulic system, with the front plate of the box-section setback from the fronts of the side-frames and with the back plate of the box-section preferably rising from the apex formed by an upwardly and rearwardly sloping bottom plate and a downwardly and rearwardly sloping cover plate also extending between the side frames. A shelf is preferably stepped out from the cover plate and supports an electric motor and a hydraulic operating pump driven by the motor. Pairs of gusset plates below the aforementioned apex carry pivots for the upper anchorages of the hydraulic rams, of which there are preferably two, one towards each end of the movable blade-carrying beam.

The movable blade-carrying beam is preferably fabricated, and consists of a bottom plate and a front plate, both welded to a blade backing strip, a back strip and a top strip, end pillars with grooves for the guide bars, end gussets and intermediate gussets, and pairs of smaller gussets carrying pivots for the lower anchorages of the hydraulic rams. The movable blade-carrying beam preferably lies behind a cover plate extending between the fronts of the side-frames.

The side-frames preferably consist of thick plates of L-shape, notched out at the inside junctions of the arms for side access to a bolster-receiving member, and the side plates are preferably connected below the bolster-receiving member by means of further vertical and/or horizontal and/or inclined plates or by means preferably of a fabricated box-section reinforcing beam. The bolster-receiving member is preferably provided with a rebate with a parallel-sided groove extending into the member from the base of the rebate, as described in British Patent No. 896,761, to enable a bolster provided with a mating tongue to be fitted in the rebate and adjusted in relation to the rear face of the rebate without disengagement of the tongue from the groove, so that rotation of the bolster about its longitudinal axis, when a downward load is applied to a blade secured to the bloster, is resisted.

The usual clamping bar for the workpieces is preferably carried by the side-frames through a pair of rams for applying the clamping pressure, with spring or pressure return; thus the front cover plate is required to do no more than enclose the upper part of the movable blade-carrying beam and, therefore, can be relatively thin.

The top of the reinforcing beam affords a support table for workpieces and may be extended by support arms dove-tailing into the front of the beam. The box-section of the reinforcing beam is preferably narrower towards the bottom side and/or terminates short of the bottom of the side-frames, to enable an operator to approach close to the front of the machine. The rear side of the reinforcing beam may slope downwardly and rearwardly from the bolster-receiving member, for directing scrap material towards the open lower rear portion of the machine for ready removal, or a rearwardly sloping or curving plate may be provided for the same purpose, as well as providing further reinforcement. A sloping or curving plate may be provided for the same purpose, as well as providing further reinforcement.

The invention will now be further described by way of example with reference to the accompanying drawings, in which, FIGURE 1 is a front elevation of a guillotine;
FIGURE 2 is an end elevation of FIGURE 1;
FIGURE 3 is a section on the line III to III of FIGURE 1;
FIGURE 4 is a section on the line IV to IV of FIGURE 3;

FIGURE 5 is an enlarged view of the guide means, and

FIGURE 6 is a section on the lines VI to VI of FIGURE 5.

Figure 1:
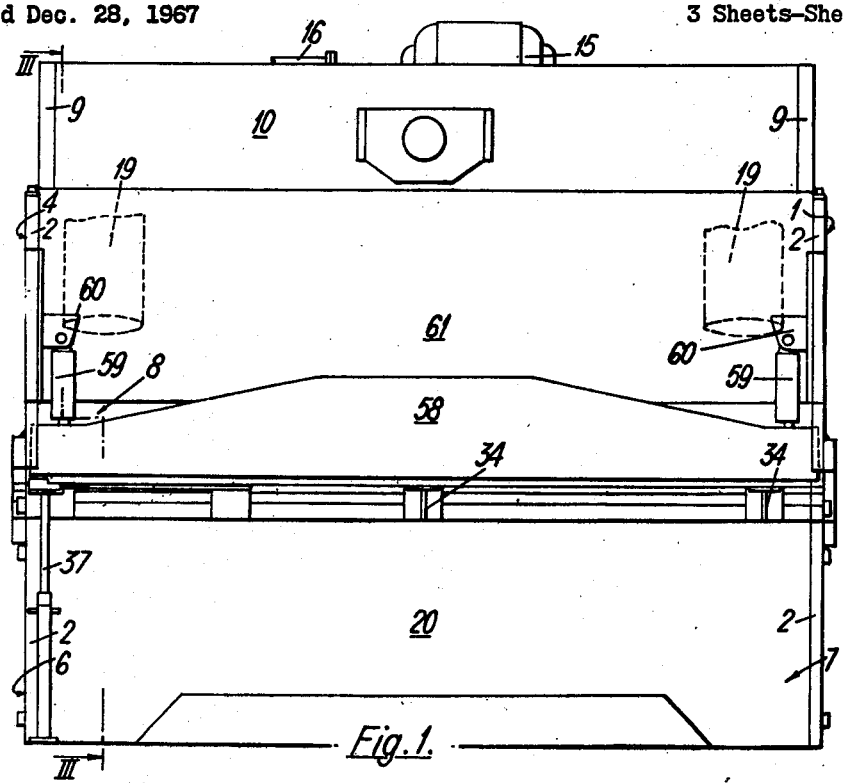

In FIGURES 1 to 4, a guillotine indicated generally at 1 has side frames 2 of thick plate and of L-shape notched out at 3 at the junction of the arms forming the L-shape. The upper edges 4 of the side frames are secured together by a cross-beam indicated generally at 5, and the lower edges 6 are secured together by a reinforcing beam indicated generally at 7, and between the cross-beam 5 and the reinforcing beam 7 and between the side frames 2 is a movable blade carrying beam indicated generally at 8.

The cross-beam 5 is of fabricated box section with its ends 9 sealed to serve as a hydraulic fluid reservoir, and consists of a front plate 10, a back plate 11 and an upwardly and rearwardly sloping bottom plate 12. From the junction of the back and bottom plates 11, 12, a downwardly and rearwardly sloping cover plate 13 extends between the side plates 2. A shelf 14 is stepped out from the cover plate to support an electric motor 15 for a hydraulic pump 16. In the apex formed by bottom plate 11 and cover plate 13, are welded two pairs of gusset plates 17, each pair carrying a pivot 18 to serve as an upper anchorage for an associated hydraulic ram 19.

The reinforcing beam 7 is of fabricated box section and consists of a front plate 20 and a rear plate 21 extending between end plates 22 formed by extensions of each side member 2. Also extending between the end plates 22 are a bolster receiving member 23 and a cross member 24. The bolster receiving member 23 is provided with a rebate 25 and a groove 26 to house a bolster 27 with a tongue 28 to fit groove 26, which bolster in turn supports a fixed blade 29. Between the members 23 and 24 is supported a table plate 30 to support a workpiece to be cut (not shown), the plate 30 being slotted at 31 to allow the periphery of rollers (not shown) housed in a U-section bracket 32 to project through the slots 31 to ease manipulation of the workpiece. A dovetail slot 33 along the front face of the cross-member 24 enables extensions 34 with a corresponding dovetail projection 35 to provide further support for a workpiece laid on plate 30. A rule 36 may be similarly supported, with its free end supported by an adjustable leg 37. A rearwardly sloping plate 38 provides further reinforcement for the beam 7 besides directing scrap material cut from a workpiece towards the rear of the guillotine ready for removal.

The movable blade carrying beam 8 is fabricated from a bottom plate 39 and a front plate 40 welded to a blade backing strip 41, with a back strip 42, a top strip 43, and a blade 44 all extending between end pillars 45 of channel section, the open side of which faces the side frames 2.

Each side frame 2 is provided with a vertical groove 46 opposite the open side of each pillar 45, the channel section of each pillar and the adjacent groove co-operative to form vertical guides to house a guide bar 47. Each channel section is wide enough to accommodate, in addition to a guide bar, an adjusting block 48, as can best be seen in FIGURES 5 and 6, of wedge section and provided with positioning screws 49, different size blocks being adapted to be inserted for adjusting the sliding fit of the guide bars 47. Thrust pin or roller and cushion block combinations 50 are loaded by spring washers 51 acting also on thrust plate 52 and serve to centralise the movable blade carrying beam 8 with respect to the side frames 2.

Figure 4:
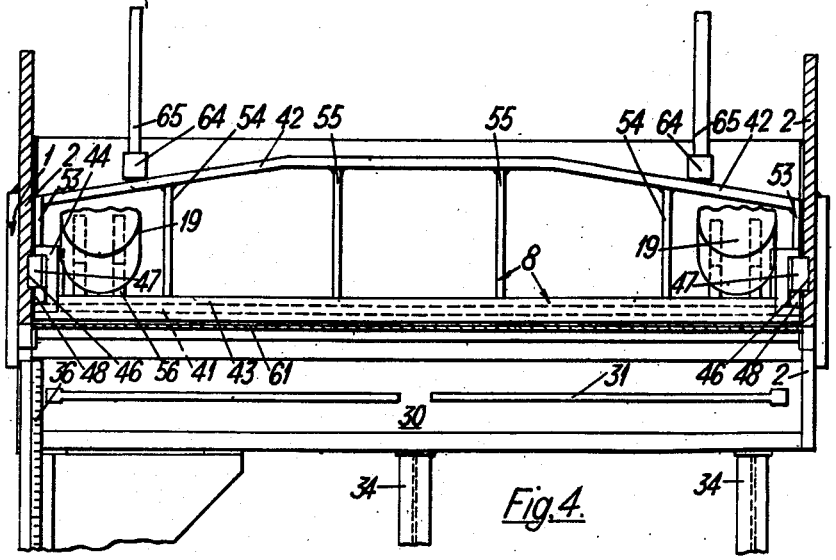

As can best be seen in FIGURE 4, welded between the bottom plate 39 and the front plate 40 of the movable blade carrying beam 8 are end gussets 53, intermediate gussets 54, 55 and smaller gussets 56 each carrying a pivot 57 to serve as a lower anchorage for the associated hydraulic ram 19.

A clamping plate 58 for the workpiece to be cut is carried by the side frames 2 through a pair of rams 59 supported by brackets 60. Extending between the side frames 2 on the operators side of the machine is a front cover plate 61. Extending into the notch 3 is an adjustable back stop 62 consisting of a stop rod 63 supported by slide member 64 which is slidably mounted on rod 65 supported by member 66.

Figure 2:
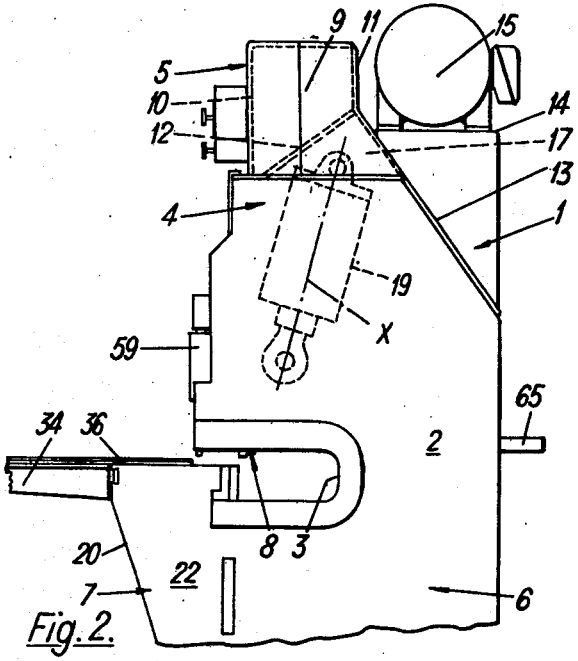
Figure 3:
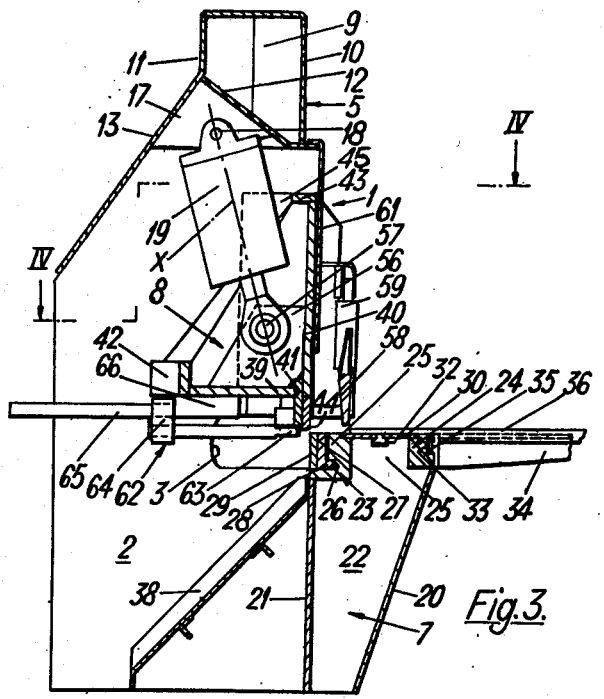

Thus, it can be seen from FIGURES 2 and 3, that with the axis X of the rams 19, and hence their inclination, at an angle approximating that of the resultant of the cutting and shear forces and during cutting of a workpiece, the rams 19, cross-beam 5 and side members 2 absorb this resultant force rather than the vertical guides 47. Also, with the rams 19 and cross-beam 5 in such positions as shown, ready access is possible to the vertical guides without first the removal of the blade carrying beam.

What I claim is:

1. A hydraulically-operated guillotine including side frames, a movable blade-carrying beam extending between the side frames, vertical guides for the movable blade-carrying beam, hydraulic rams inclined downwardly and forwardly at an angle corresponding closely to the plane of the resultants of the cutting forces and the shear forces acting on the movable blade-carrying beam during cutting, an upper cross beam set back from said vertical guides on the side-frames and mounting said rams, said vertical guides including stationary guide bars adjacent the ends of the movable blade-carrying beam, and channel grooves on said blade-carrying beam in operative engagement with said bars, said guide bars being removable from said side frames in the direction of travel of said blade-carrying beam, whereby said blade-carrying beam need not be removed when inspecting and replacing said guide bars.

2. A hydraulically-operated guillotine as in claim 1 wherein is provided mounting grooves on the inside of said side-frames to position said guide bars, said grooves allowing upward removal of said guide bars past said cross beam.

3. A hydraulically-operated guillotine as in claim 2, wherein each channel groove is wider than the guide bars and accommodates a single block with a slight wedge section, and means to position said blocks so as to form bearing surface for said guide bars.

4. A hydraulically-operated guillotine as in claim 2 including spring-loaded thrust pins extending from the bottoms of the channel grooves into contact with the guide bars, said pins spacing said bottoms of said channel grooves from said guide bars along the full length thereof.

5. A hydraulically-operated guillotine as in claim 1, wherein is provided a bolster, a lower fixed cutting blade mounted on said bolster below said movable blade-carrying beam for cooperation therewith, and lower fabricated box-section reinforcing beam to connect the lower portion of said side members in the area of stress produced by the operation of the guillotine.

6. A hydraulically-operated guillotine as in claim 5 wherein the rear side of the reinforcing beam slopes downwardly and rearwardly from the bolster-receiving member, said rear side serving as a slide for the scrap resulting from said operation.

References Cited

UNITED STATES PATENTS

| | | | |
|---|---|---|---|
| 1,381,188 | 6/1921 | Gury | 308—3 |
| 2,449,327 | 9/1948 | Schlitters | 308—3 |
| 2,719,761 | 10/1955 | Bonnafe | 308—3 |
| 2,931,182 | 4/1960 | Anderson et al. | 83—639 |
| 2,947,224 | 8/1960 | Woytych | 308—3 X |
| 3,115,824 | 12/1963 | Longfield | 83—635 X |
| 3,131,589 | 5/1964 | Hazelton et al. | 83—639 X |
| 3,371,569 | 3/1968 | Pearson et al. | 83—639 X |

FOREIGN PATENTS 783,424  9/1957  Great Britain.

JAMES M. MEISTER, Primary Examiner

U.S. Cl. X.R.

83—624, 635, 639